(12) United States Patent
Bible, Jr. et al.

(10) Patent No.: US 6,856,976 B2
(45) Date of Patent: Feb. 15, 2005

(54) SECURED COMMERCIAL TRANSACTION

(75) Inventors: Robert Bible, Jr., Rancho Santa Fe, CA (US); Mark Steven Burnett, La Jolla, CA (US)

(73) Assignee: 900Pennies Incorporated, San Diego, CA (US)

( * ) Notice: Subject to any disclaimer, the term of this patent is extended or adjusted under 35 U.S.C. 154(b) by 313 days.

(21) Appl. No.: 09/728,361

(22) Filed: Dec. 1, 2000

(65) Prior Publication Data

US 2002/0069180 A1 Jun. 6, 2002

(51) Int. Cl.[7] .............................................. G06F 17/60
(52) U.S. Cl. .......................... 705/51; 705/50; 705/59; 705/64; 705/71; 705/74; 705/75; 705/76
(58) Field of Search ................... 705/50–80; 713/150; 380/277

(56) References Cited

U.S. PATENT DOCUMENTS

| | | |
|---|---|---|
| 5,537,585 A | 7/1996 | Blickenstaff |
| 5,727,129 A | 3/1998 | Barrett |
| 5,761,663 A | 6/1998 | Lagarde |
| 5,768,528 A | 6/1998 | Stumm |
| 5,832,522 A | 11/1998 | Blickenstaff |
| 5,850,442 A | 12/1998 | Muftic |
| 5,960,411 A | 9/1999 | Hartman |
| 5,978,476 A * | 11/1999 | Redman et al. ................. 380/4 |
| 6,226,618 B1 * | 5/2001 | Downs et al. ................. 705/1 |
| 2002/0112171 A1 * | 8/2002 | Ginter et al. ................ 713/185 |
| 2004/0064688 A1 * | 4/2004 | Jacobs ......................... 713/150 |

FOREIGN PATENT DOCUMENTS

WO  WO 00/14918  *  3/2000  ............ H04K/1/06

OTHER PUBLICATIONS

Sibert et al., "Securing the Content, Not the Wire, for Information Commerce", 1996, Intertrust Commerce Architecture.*

* cited by examiner

*Primary Examiner*—James P. Trammell
*Assistant Examiner*—Jalatee Worjloh
(74) *Attorney, Agent, or Firm*—Nydegger & Associates

(57) ABSTRACT

A system and method for transferring an encrypted file over the Internet involves a seller, a buyer, and a transaction agent. First, the seller creates a file for publication on the Internet. This file has, at least, an overhead part that is encrypted with a public key provided by the transaction agent, and it has a content part that is encrypted with a private key provided by the seller. In operation, the buyer selects the desired file from the Internet and sends its overhead part to the transaction agent for decryption. The decryption is then done using the public key to ascertain the private key. Subsequently, the private key is used, either by the transaction agent or by the buyer, to decrypt and reveal the content part of the file from the Internet for use by the buyer.

7 Claims, 2 Drawing Sheets

SECURED COMMERCIAL TRANSACTION

FIELD OF THE INVENTION

The present invention pertains generally to systems and methods for conducting secure commercial transactions in an open marketplace. More particularly, the present invention pertains to systems and methods for altering a file before it is to be sold by a seller, and then revealing the file for subsequent use by a buyer. The present invention is particularly, but not exclusively, useful for conducting an Internet transaction wherein a public key is employed to conceal a private key that, in turn, will decrypt the file and allow it to be revealed.

BACKGROUND OF THE INVENTION

Artists, when they want to sell their work products, are like any other seller in a marketplace. They desire to be somehow compensated for their efforts. The work product of an artist, however, unlike many other kinds of work products, has value primarily because of the unique expression that is given to the particular work by the artist. Unfortunately, this expression is often susceptible to being copied. This is so regardless of the particular type of work product involved; whether it be a literary work, a musical work, a dramatic work, a pictorial work, an audiovisual work, a sound recording or a work in some other form.

An ever-present problem for the artist/author of a publishable work has been how best to offer the work to an audience. More specifically, the concern has been for how to offer the work product in a manner that will ensure the artist is appropriately compensated for his/her endeavors. Heretofore, many artists have relied on publishing houses in order to commercially offer their respective works to the public. This, of course, assumes the artist/author is able to interest the publishing house in the work product, and the publishing house determines the work product is commercially viable. If the work is published, the publishing houses have taken control over the marketing of the artist's work and, not surprisingly, have done so on terms favorable to the publishing house. In such arrangements, the artist's compensation has normally been in the form of royalties that are paid to the artist by the publishing house. Typically, these royalties have somehow been based on sales of the work in the marketplace. The marketplace as it was once known, however, has changed with the advent of the Internet.

As it has developed over recent years, the Internet provides a new and distinctive marketplace for an artist. Specifically, from the perspective of an artist/author, electronic publishing on the Internet provides a unique opportunity in at least two important respects. First, standard Web page publication tools are now available that enable an artist to individually prepare his/her own work product for publication on the Internet. Second, all or a part of the artist's published work product can be encrypted. Further, insofar as encryption is concerned, there are two types of keys that are useful for the purpose of protecting information. One type of key is a "public" key, the other is a "private" key.

In general, a "public" key involves a system for generating encrypted messages in which only the intended recipient can decode the messages. This will be so even though the encryption key is made public. More specifically, this "public" key is in two parts and includes an encryption key, as its first part, which can be used to encrypt, encode or otherwise alter a message. The second part of the "public" key is a decryption key that, in effect, is a secret counterpart of the encryption part of the public key. Importantly, only an intended recipient of the message can use the decryption key to decrypt, decode, restore or otherwise reveal the message. On the other hand, unlike the "public" key, a "private" key (sometimes referred to as a "local" key) involves a system for generating encrypted messages in which any recipient having the encryption key can also decode the messages. Private keys are generally well known in the pertinent art, and they can be either so-called "symmetric" keys or "asymmetric" keys.

In light of the above, it is an object of the present invention to provide a system and method which allows an artist/author to publish an encrypted work that must be decrypted in a two-step process. Another object of the present invention is to require the decryption of a work, using two different decryption keys, in a manner that enables the direct payment of compensation from the audience (buyer) to the artist (seller) in a secure and essentially instantaneous transaction. It is another object of the present invention to provide a system and method for decrypting an encrypted, two-part work (file) which allows the artist (seller) to publish works on the Internet using standard publication tools. Still another object of the present invention is to provide a system and method for decrypting an encrypted work in a manner that diminishes the economic incentive for copying the work. Another object of the present invention is to provide systems and methods for a secured commercial transaction that facilitate the sale of a work product on the Internet by allowing the artist (seller) to place his account number and price, together with the work product, in a single file that is functional beyond the control of the artist. Yet another object of the present invention is to provide a system and method for decrypting an encrypted work that is simple to implement, easy to use, and comparatively very cost effective.

SUMMARY OF THE PREFERRED EMBODIMENTS

In accordance with the present invention, a system and a method for conducting secured commercial transactions over the Internet involves a buyer, a seller, and a transaction agency. More specifically, the transaction agency facilitates and enables completion of a commercial transaction between the seller (artist) and the buyer (audience). In accordance with the present invention, the subject matter of this transaction can be information that is revealed and directly downloaded from the Internet by the buyer. Additionally, it can be an invoice which is evidence of a collateral transaction between the buyer and the seller or a document showing proof-of-payment. In any case, the concepts of the present invention are applicable.

The file that is created by the seller contains at least two mandatory parts. These are an overhead and a content. It should be noted, however, that the file may also contain a header as an optional third part. Importantly, the overhead part of the file is encrypted by the seller using a public key that is provided to the seller by the transaction agent. Thus, even though the overhead is encrypted by the seller, in accordance with the present invention only the transaction agent might be capable of decrypting or decoding the overhead. As contemplated for the present invention, the overhead of the file will include commercial material about the file, such as pricing and payment terms. Also, it may contain such information as the minimum allowed payment, the file name, and the seller's accounting identification. Further, the overhead may also contain the number of times the content may be decrypted, an expiration date, and the buyer's account identification in the event the file is intended for a single buyer. Most importantly, the overhead will also include a private key which must be used by a potential buyer to decrypt the content part of the file.

As implied above, in addition to the encryption of the overhead part of the file (using a public key), the content part of the file is also encrypted. The content part of the file, however, is encrypted using a private key. As contemplated for the present invention, the content part of the file will include the particular work or works being sold for value by the seller. Examples of the content part of the file include: books, documents, pamphlets, movies, songs, games, pictures, software, or passwords. Additionally, the content may also include such information as Internet search results, coupons, proof-of-purchase codes, passwords, private Internet URL's, and answers to questions.

Not all of the file needs to be encrypted. Unlike either the overhead part of the file or the content part of the file, the header of the file can be in clear text and will not be encrypted. This, of course, is done to allow the potential buyer to see and evaluate information contained in the file. For this purpose, the header can include advertising and informational material about the content of the file, samples of the content and suggested prices, as well as informational material about the seller. Further, the header can include actual portions of the content of the file.

In the operation of the systems and methods of the present invention, the seller creates a file (header, overhead and content) that is presented on an Internet website or in some other marketing venue. For this presentation, the seller encrypts the content part of the file with a local key that is under the control of the seller. Also, the seller encrypts the overhead part of the file with a public key that is obtained by the seller from the transaction agency and is under the control of the transaction agency. Recall, the overhead part of the file also includes the seller's private key. After the overhead and the content parts of the file have been encrypted, the seller then presents the clear text header of his/her file to the scrutiny of potential buyers in the marketplace. It is to be noted at this point that the seller presents the whole file to the marketplace. This includes, the header, the overhead and the content. Only the header, however, can be read even though the whole file is available to everyone. Further, in this condition, the file may be downloaded and traded without incurring any monetary transaction, and without revealing any content.

When a buyer has decided to purchase a particular content from the seller, the buyer will "click on" a link to the file (e.g. a logo at the website) to notify the transaction agency of his/her intention to purchase the file. The transaction agency will then decrypt the overhead part of the file that was encrypted with its public key to reveal the seller's private key. This private key is then used to decrypt or decode the content part of the file. As envisioned by the present invention this decryption of the content can be accomplished either directly by the buyer, or it can be accomplished by the transaction agent who will then send the decrypted file to the buyer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
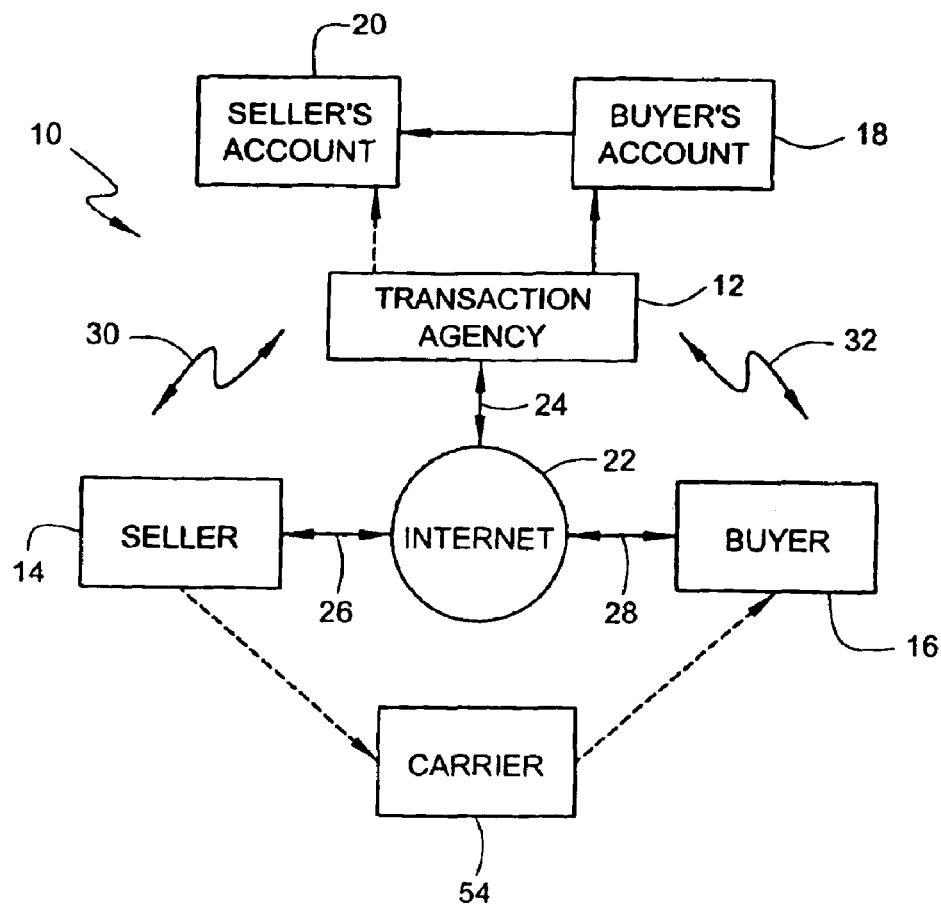
FIG. 1 is a schematic representation of the respective parties to a transaction that is accomplished in accordance with the present invention.

Referring initially to FIG. 1, a schematic representation of a transaction group, that includes the respective parties to a commercial transaction as it is to be accomplished in, accordance with the present invention, is shown and is generally designated 10. As shown, the group 10 essentially includes a transaction agency 12, a seller 14 and an buyer 16. Further, it is indicated in FIG. 1 that the transaction agency 12 effectively controls a buyer's account 18, and a seller's account 20.

Still referring to FIG. 1, it is shown for a preferred embodiment of the present invention that each of the parties in the group 10 (i.e. transaction agency 12, seller 14 and buyer 16) are connected in communication with the Internet 22. These communication connections with the Internet 22 are respectively indicated in FIG. 1 by arrow 24 (transaction agency 12), arrow 26 (seller 14), and arrow 28 (buyer 16). It is envisioned for the present invention that, instead of using the Internet 22, communication between the various parties of group 10 can be conducted by other means well known in the pertinent art, such as by land line or wireless telephone connections. The arrow 30 between transaction agency 12 and the seller 14, as well as the arrow 32 between the transaction agency 12 and the buyer 16 are both exemplary of such connections.

Figure 2:
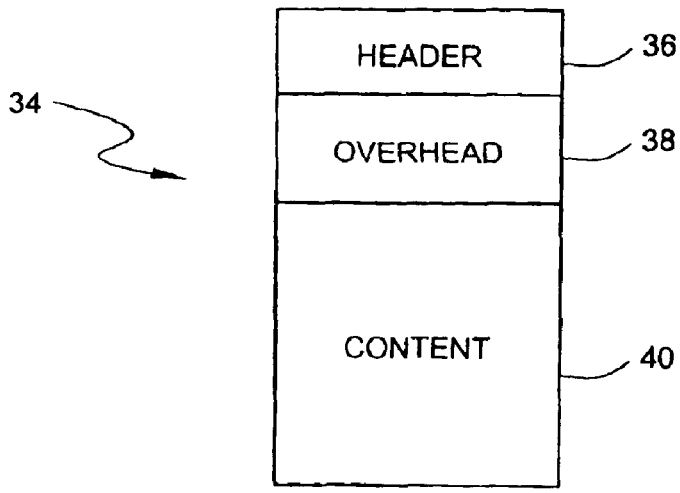
FIG. 2 is a schematic representation of the component parts of a file (object) that is published by an artist (seller) for a transaction that is to be accomplished in accordance with the methods of the present invention.

In FIG. 2, a representative schematic of a file (object) that is created by the seller 14 in accordance with the present invention, is shown and is generally designated 34. Specifically, the component parts of the file 34 are a header 36, an overhead 38 and a content 40. As envisioned for the present invention, the header 36 will include public material and will remain in clear text. More specifically, the header 36 can include advertising and informational material about the seller 14 and his/her work product. For example, the header 36 can include the title of a work, its table of contents, an introduction to the work and, perhaps, even selected portions of the work. By way of further example, such selections may include portions of a poem, or the first thirty seconds of a song. In any event, as indicated above, it is envisioned that the header 36 will not be encrypted and will be presented in clear text for perusal and consideration by a potential buyer 16.

Unlike the header 36, both the overhead 38 and the content 40 of the file 34 are to be encrypted. Specifically, the overhead 38 is to be encrypted using a public key, and the content 40 is to be encrypted using a private key. Within the encrypted overhead 38 there will be general information about the pricing and payment terms that are established by the seller 14 for the conduct of the commercial transaction. Most importantly, the overhead 38 will include the private key that will eventually be used by a potential buyer 16 for decrypting the content 40. The content 40 of the file 34 will then include the actual work product that is being presented by the seller 14 for sale to the buyer 16. Recall, this all may be done on either the Internet 22 or in any other convenient marketing venue.

Figure 3:
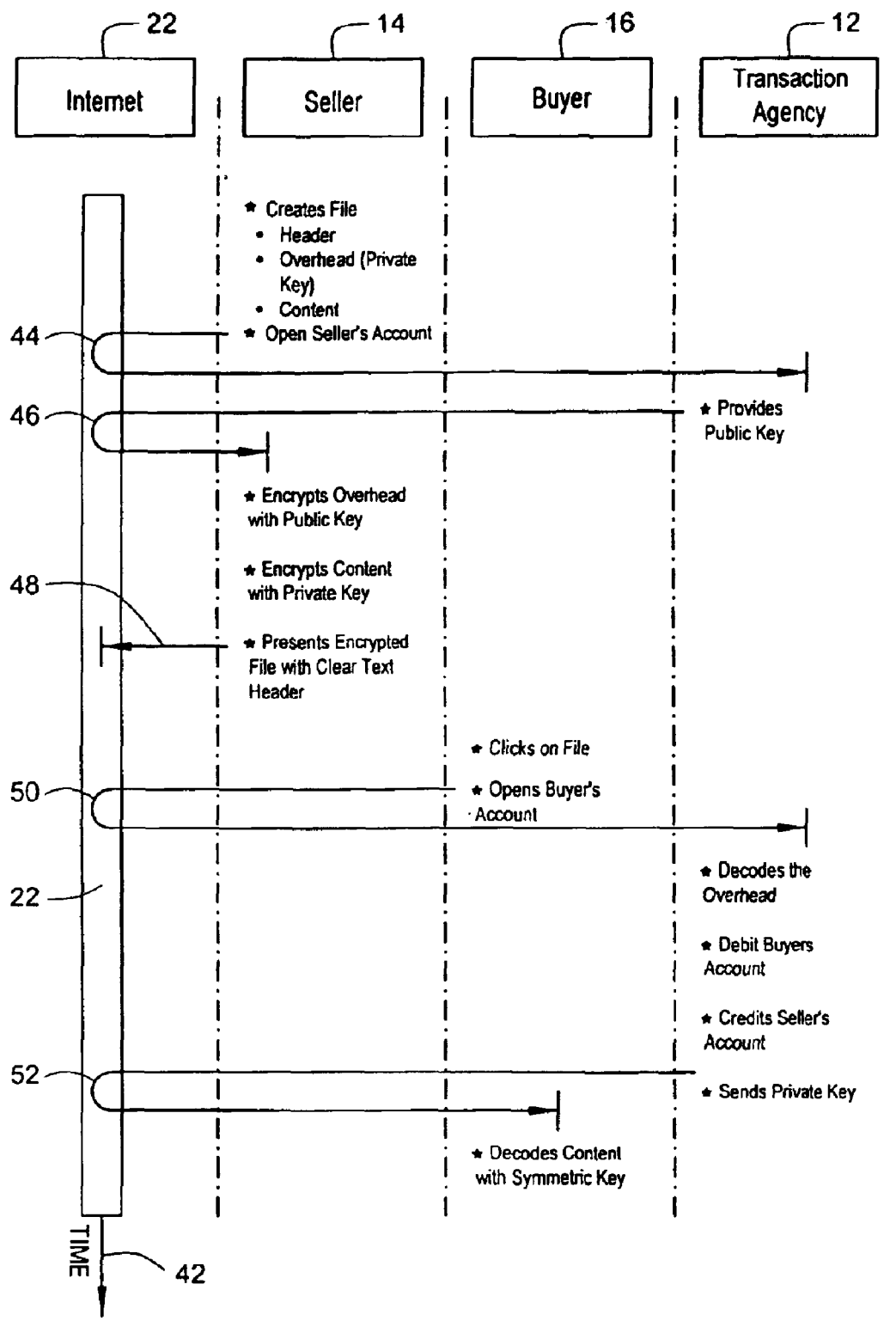
FIG. 3 is a time-line representation of the actions that are to be taken by participating parties during a transaction as it is to be accomplished in accordance with the methods of the present invention.

The actual operation of the methods and system of the present invention will be best appreciated with reference to FIG. 3. Specifically, FIG. 3 presents a time line 42 for the actions that are to be taken by the various parties of group 10 during a transaction in accordance with the present invention. As indicated in FIG. 3, it is first necessary for the seller 14 to create the file 34 (FIG. 2). Then, unless previously accomplished, the seller 14 will open the seller's account 20 with the transaction agency 12. This action is indicated in FIG. 3 by the arrow 44. When the seller's account 20 is opened, the transaction agency 12 will receive administrative information from the seller 14, and the transaction agency 12 will provide the seller 14 with a public key as indicated by the arrow 46. Recall, a "public" key is an encryption/decryption device for generating encrypted messages. The public key is unique, however, in that only the intended recipient can decode the messages. This will be so even though the encryption key is made public. For the present invention, the intended recipient is the transaction agency 12.

Upon receipt of the public key from the transaction agency 12, the seller 14 will then encrypt the file 34. Specifically, the seller 14 will use the public key to encrypt the overhead 38. The seller 14, however, will use a private key to encrypt selected portions, or all, of the content 40. The header 36 remains in clear text. As indicated by the arrow 48 in FIG. 3, the file 34 is then presented on the Internet 22 for possible purchase by a buyer 16.

Once the work product (e.g. file 34) of the seller 14 has been published and offered for sale on the Internet 22, the potential buyer 16 is able to peruse the clear-text header 36 to determine whether he/she desires to purchase the content 40. If so, the buyer 16 will "click on" the file 34, or they will otherwise manifest their intent to purchase the content 40 of file 34. At this time, unless earlier accomplished, the buyer 16 opens the buyer's account 18 with the transaction agency 12. This action is identified in FIG. 3 by the arrow 50 and it can be accomplished in any of several ways well known in the art, such as by telephone, written correspondence, or over the Internet 22. Subsequently, assuming that the buyer 16 has been successful in opening or establishing a viable buyer's account 18 with the transaction agency 12, several actions are taken by the transaction agency 12.

The time line 42 in FIG. 3 indicates that after a buyer 16 has indicated a desire to purchase the content 40 of file 34, the transaction agency 12 will then decode or decrypt the overhead 38. To do this, the transaction agency 12 uses the public key that was earlier provided to the seller 14 for encryption of the overhead 38. Recall, only the transaction agency 12 is capable of using the public key for decryption of the overhead 38. Thus, after decrypting the overhead 38, the transaction agency 12 can then send pricing and payment terms to the buyer 16 (indicated by arrow 52 in FIG. 3). The buyer 16 may then approve or cancel the transaction. Alternatively, the buyer 16 may forward a bid to the transaction agency 12 along with the overhead 38. If approved, the transaction agency 12 will debit the buyer's account 18 and credit the seller's account 20 with whatever value has been determined by the various parties of the transaction group 10 in their respective dealings with each other.

The final actions that will be taken to complete the transaction envisioned by the present invention, are to decrypt and reveal the content 40 of the file 34 to the buyer 16. This can be done in several ways. Preferably, once the transaction agency 12 has decoded the overhead 38 (which includes the private key) the transaction agency 12 will transfer the private key to the buyer 16. The buyer 16 is then able to directly decode or decrypt the content 40 with the private key. Alternatively, after the buyer 16 has indicated his/her desire to purchase the content 40 of file 34, and the buyer's account 18 has been opened, the transaction agency 12 can decode or decrypt the content 40 of file 34. The decrypted content 40 will then be sent from the transaction agency 12 to the buyer 16. In yet another variation, instead of being the actual work product of the seller 14, the content 40 can be an invoice or a proof-of-payment code, to be presented to the seller 14, that is evidence of a collateral transfer of merchandise. In such a case, the work product of the seller 14 will, most likely, be transported to the buyer 16 by a carrier 54 (see FIG. 1).

While the particular Secured Commercial Transaction as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A computerized method for employing a transaction agency to electronically transfer a two-part file from a seller to a buyer, wherein said two-part file includes an overhead and a content and said method comprises the steps of:

encrypting said file, wherein at least a portion of the content is encrypted by the seller using a private key, and wherein the overhead includes the private key and is encyprd using a public key provided by the transaction agency;

transferring said encrypted file on the internet from the seller to the buyer;

seperating said two part file into the encrypted content and the encrypted overhead at the buyer;

sending said overhead from the buyer to the transaction agency;

decrypting the overhead by the transaction agency, using the public key to reveal the private key;

providing the revealed private key to the buyer; and using the private key by the buyer to decrypt the content.

2. A method as recited in claim 1 wherein the overhead is encrypted by the transaction agency.

3. A method as recited in claim 1 wherein the overhead is encrypted by the seller.

4. A method as recited in claim 1 wherein said two-part file is periodically changed.

5. A method as recited in claim 1 wherein the overhead contains commercial material about said file, including pricing and payment terms.

6. A method as recited in claim 5 wherein said file further comprises a header containing clear-text advertising material about the content and informational material about the seller.

7. A method as recited in claim 1 wherein the content includes work selected from a group consisting of books, documents, pamphlets, movies, songs, games, pictures and software.

* * * * *